Sept. 1, 1953  W. W. MEYER  2,650,841
SEAL
Filed March 25, 1948
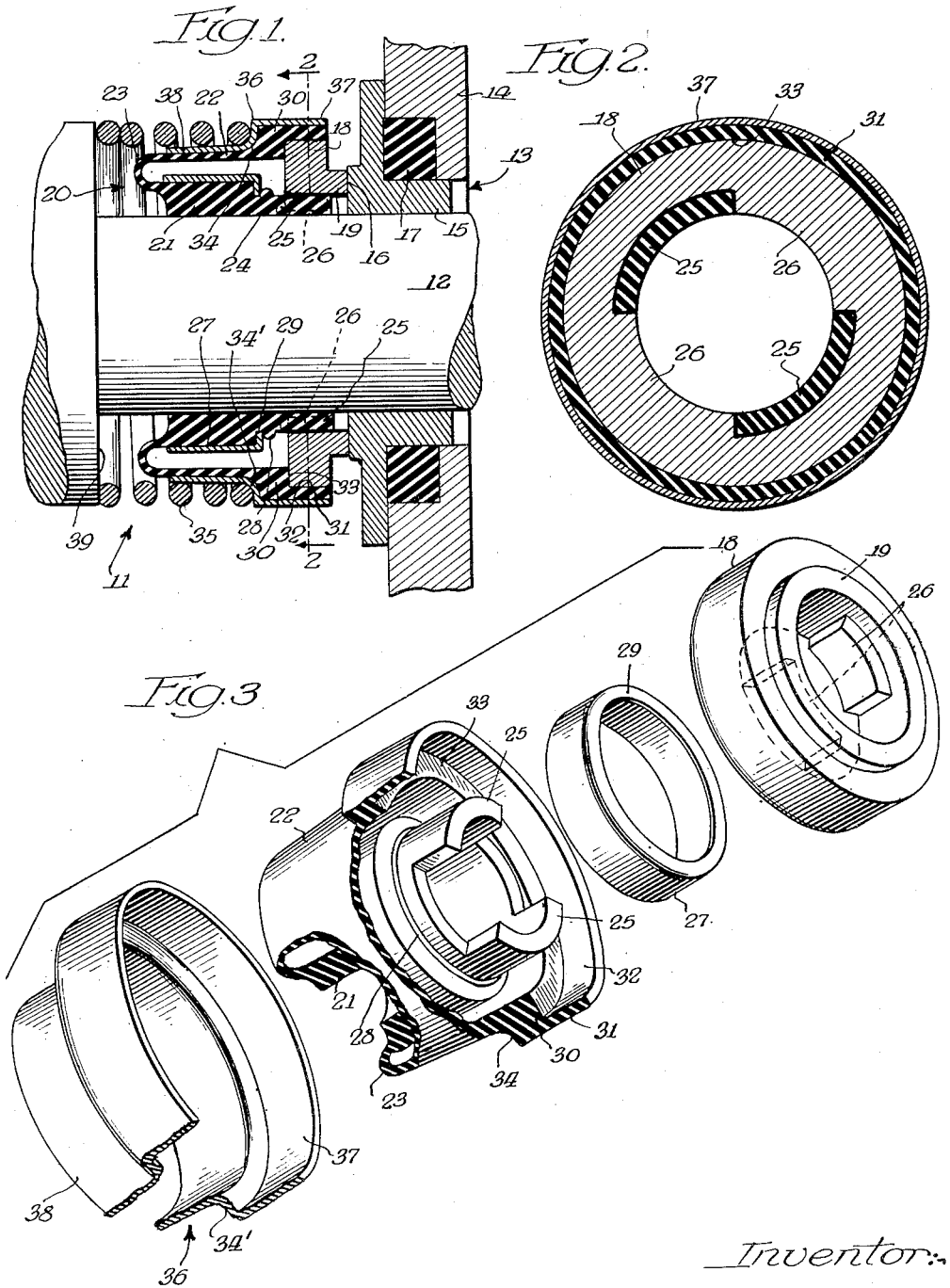
Inventor:
Walter W. Meyer
By: Spencer, Marzall, Johnston & Cook
Attys.

Patented Sept. 1, 1953

2,650,841

UNITED STATES PATENT OFFICE 2,650,841

SEAL

Walter W. Meyer, Cuba Township, Lake County, Ill., assignor to Rotary Seal Company, Chicago, Ill., a corporation of Illinois Application March 25, 1948, Serial No. 16,970

6 Claims. (Cl. 286—11)

The present invention relates in general to shaft seals, and has more particular reference to the provision of improved means for sealing rotating shafts for the prevention of fluid leakage along the shaft past the seal.

Seals of the sort herein disclosed include a seal ring adapted to be mounted in position encircling the shaft to be sealed, and having an annular face formed for running engagement with a cooperating seat, within which, and with respect to which, the shaft is adapted to turn, the seal ring being mounted against turning movement with respect to the shaft. Suitable yielding means may be provided for urging the seal ring into close running contact with the seal seat. Such yielding means may comprise a helical spring encircling the shaft and bearing on a shaft abutment at one end and on the seal ring at the other to yieldingly thrust the ring upon its seat. The seal also may include suitable gasket means having an annular portion sealingly engaging upon the shaft, and a concentric rim portion sealingly engaging the seal ring, whereby fluid leakage along the surface of the shaft is blocked by the gasket portions sealed thereto, while leakage of fluid outwardly of the shaft is blocked by the gasket and the seal ring, leakage between gasket and ring being prevented by the sealing engagement therebetween, and leakage between the ring and its cooperating seat being prevented by the running engagement of the highly polished engaging surfaces of the ring and seat.

In seals of the character mentioned, the gasket means may comprise resilient, rubber-like material adapted to frictionally fit upon and sealingly engage the shaft at a central sleeve-like shaft-receiving gasket portion, the gasket having marginal portions extending outwardly of its shaft receiving portions and sealingly secured to the ring, circumferentially thereof, whereby said gasket seals against the passage of fluid through the ring, outwardly of the shaft. The resilience of the gasket material allows the seal ring to adjust itself upon the shaft under the influence of the seating spring, in order that at all times to engage the seal seat with substantially equal pressure throughout the circumference of the ring. Means is also desirably provided for causing the ring to turn with the shaft; and the material of the gasket itself is commonly employed to drivingly connect the ring with the shaft. In such case, the gasket necessarily is of sufficiently thick sectional dimension to accomplish the ring driving function; and it has thus, heretofore, been necessary to sacrifice desirable gasket flexibility for the sake of adequate ring driving rigidity in the gasket portions extending between the ring and the shaft. Where ring driving rigidity is provided in the gasket, substantial spring thrust is required to maintain adequate sealing engagement between the ring and its seat.

An important object of the present invention is to provide a shaft seal of the character described, wherein an exceedingly flexible gasket element is employed with consequent minimum seal seating spring thrust, thereby maintaining seal wear at a minimum and requiring a light and inexpensive thrust spring; a further object being to utilize a sealing gasket of extreme flexibility, while providing improved means for adequately driving the ring from the shaft through the gasket.

A further object is to utilize an extremely flexible sealing gasket in a shaft seal of the character described, in conjunction with unusually light thrust loading to maintain running engagement of the seal ring with its cooperating seat, thereby allowing the seal to operate at maximum speed under the pressure and temperature conditions prevailing at the seal, without damage to the running seal surfaces, maximum permissible running speed, for given seal materials, being an inverse function of spring loading.

A further object is to provide a shaft seal embodying a gasket comprising a diaphragm portion of maximum flexibility, and ring driving portions which do not interfere with or impair the flexibility of the diaphragm portion when the seal is in operation; a further object being to provide a gasket comprising an annular diaphragm of relatively narrow, trough-like configuration, in radial section, in which the inner wall of the trough-like diaphragm may sealingly and frictionally engage the shaft and may also provide a driving connection with the seal ring, and wherein the outer wall of the trough-like gasket may be sealed to the periphery of the ring.

Another important object is to provide a seal of the character mentioned, embodying an annular trough-like gasket, wherein the inner and outer walls of the gasket are concentric, one with respect to the other, and wherein the seal ring is mounted between the concentric gasket walls at one end of the gasket, thereby providing a seal having minimum overall radial dimensions.

Another important object is to provide a seal of the character described, wherein the gasket and seal ring may be assembled and merchandised as a unit, ready for application to a shaft to be sealed; a further object being to provide a retaining collar for application, in the assembly unit, upon and surrounding the outer wall of the gasket to receive the thrust of the seal seating spring; a still further object being to form said retaining collar to frictionally interfit with the seal seating spring and frictionally hold the same in mounted position as a part of the assembly unit.

Another important object resides in providing a clamp ring in position snugly encircling the inner wall of the gasket to hold the same in frictional sealing engagement with the shaft on which the seal is mounted; a further object being to provide interengaging portions comprising an annular rib on the inner wall of the gasket and an inturned flange on the clamp ring, for locking the clamp ring in position on the gasket.

Another important object resides in providing the outer gasket wall with an annular seat for receiving the peripheral portions of the seal ring, including a skirt portion formed on the outer wall of the gasket in position to overlie, encircle, and frictionally and sealingly engage the peripheral edge surfaces of the seal ring; a further object being to form the spring mounting collar element wtih an annular portion overlying and compressing the skirt portions of the gasket into tight frictional engagement with the peripheral edge portions of the ring.

Another important object is to provide a shaft seal, including a seal ring and a flexible sealing diaphragm, wherein the ring has splined driving connection with a ring driving portion of the gasket, and sealing engagement with a flexible diaphragm portion thereof.

Another important object is to provide a shaft seal of the character mentioned, which comprises a minimum number of parts, that may be manufactured at low cost, and readily assembled as a unit ready for application on a shaft to be sealed; a further object being to provide a shaft seal which, in use, imparts negligible thrust, in an axial direction, on the shaft with which used, thereby requiring minimum seal seating thrust, and consequently relatively high speed operation without damage to the running surfaces of the seal.

Another important object is to provide a seal of the character mentioned, in which the ring is entirely cushioned in the resilient material of the gasket and thereby protected from operating jars and vibration, so that relatively fragile material may be utilized in the ring, if desired or required, for superior operating characteristics of such fragile material, without undue danger of ring fracture in service.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a sectional view through a shaft and seal embodying the present invention;

Fig. 2 is a sectional view taken substantially along the line 2—2 in Fig. 1; and Fig. 3 is an exploded view of parts of the seal shown in perspective.

To illustrate the invention the drawings show a shaft seal assembly 11 for use on a shaft 12, for sealing the same against leakage along the shaft, as through an opening 13 in a member 14 through which the shaft extends. As shown, the member 14 may comprise a wall, in the opening 13 of which the shaft is turnably mounted, although the member 14 may equally well comprise a wall portion of a structure which is turnably mounted for rotation on the shaft.

In the opening 13 the wall is provided with an annular member 15 forming a seal seat 16 at and around the opening 13. The member 15 may, of course, be formed as an integral part of the wall 14, or it may be formed, as shown, as a separate collar or gland sealingly secured to the member 14, in the opening 13, as by means of suitable packing material 17.

The seal assembly 11 preferably comprises a seal ring 18 adapted to loosely encircle the shaft 12 and having an annular portion 19, on one side, for running engagement with the seat 16, the facing and engaging surfaces of the seat 16 and of the seat engaging ring portion 19 being accurately finished to provide highly polished flat surfaces adapted to form a running seal, the one against the other.

The seal ring 18 and its cooperating seat 16 may comprise any suitable wearing or bearing materials, including metal, carbon, graphite, plastic and other synthetic materials, and ceramic material, although it is preferable to form one of the members 16 and 18 of material which is softer than the other, so that one member may take operational wear while the cooperating member may remain substantially unworn. The member comprising the relatively soft material, accordingly, may be made as a replacement unit; and, to this end, it is desirable to form the ring 18, and particularly the bearing portions 19 thereof, of relatively softer material than the material of the seat 16, since it is ordinarily more expedient to supply the ring 18 as a replacement part. The seat 16, therefore, may conveniently comprise steel or other relatively hard, long wearing seat forming material, while the bearing portions 19 of the ring may comprise bronze or other suitable metal, or any other suitable bearing material for sealing engagement with the seat.

Associated with the seal ring 18, the assembly may comprise a gasket element 20, preferably formed of resilient rubber-like material, such as neoprene, synthetic rubber, or other resilient and flexible gasket material. The gasket 20 preferably comprises an annular diaphragm of generally trough-like configuration in radial section, the same comprising an inner wall portion 21, a concentrically disposed outer wall portion 22, and an exceedingly thin flexible connecting portion 23 joining the inner and outer portions 21 and 22 at one end of the trough-like diaphragm. The inner wall portion 21 of the diaphragm preferably has a portion of substantial thickness adapted to snugly fit around and sealingly engage upon the surfaces of the shaft 12 on which it is mounted, said inner wall portion being cylindrical and being integrally connected at one end with the connecting portion 23. At its other end, the inner wall portion is formed with an axial extension 24 sized to snugly engage around and upon the surfaces of the shaft, and formed to provide axial ears 25 adapted to extend within the central shaft-receiving opening of the seal ring 18 for splined driving engagement, at the opposite side edges of the ears 25, with inwardly extending lugs or splines 26, formed preferably integrally on the seal ring 18 at the central shaft-receiving opening thereof, the inwardly facing surfaces of said splines 26 being shaped for loose engagement with the surfaces of the shaft 12.

In order to clampingly secure the gasket portion 21 in tight sealing and frictional engagement with the shaft, a clamp ring 27 may be provided comprising a sheet metal band sized to fit upon and snugly embrace the outer surfaces of said inner gasket portion 21; and means may be provided for locking the clamp ring in place on said gasket portion 21, said means conveniently comprising an annular bead 28 formed on the extension 24 in position spaced from the ring facing end of the portion 21 sufficiently to interlockingly receive an inturned annular flange 29, on the clamp ring 27, to latch said flange between said bead 28 and the adjacent end of the portion 21, thereby locking the clamp ring in place.

The outer gasket portion 22, at one end, is preferably formed integral with the connecting portion 23 and merges therewith, said portion 22 preferably having progressively increasing sectional thickness in a direction away from said connecting portion. At its edge remote from the connecting portion 23, the outer gasket portion 22 is provided with a rim 30 and an integral peripheral skirt 31, forming an annular seat comprising the inner cylindrical surfaces 32 of the skirt portion 31 and the annular surface 33 formed in the rim 30. These surfaces 32 and 33 are adapted to snugly and sealingly engage, respectively, with the marginal edge of the ring 18 and with the face surface of said ring adjacent its marginal edge, to thereby afford extended sealing contact of the gasket portion 22 with the periphery of the ring 18.

The rim 30 also provides an annular outwardly facing seat 34 for receiving the thrust of a seal seating spring 35, whereby the thrust of said spring may be applied to the peripheral portions of the ring 18 through the gasket rim 30 of resilient material.

The outer wall portions 22 of the gasket are enclosed in a preferably sheet metal collar or cage 36, including a cylindrical portion 37 adapted to snugly enclose and frictionally engage upon the rim and skirt portions 30 and 31 of the gasket, said collar 36 being formed also to engage upon the gasket seat 34, and a preferably tapered collar portion 38 adapted to enclose the tapered wall portions 22 of the gasket, from the seat 34 toward the connecting portion 23 of the gasket. The collar portion 38 terminates short of said connecting portions 23 sufficiently to avoid interference with the free flexing of said portions, while affording support for the outer gasket wall portions 22 remote from said flexible connecting portions 23.

It will be seen, also, that the collar or cage 36, at the portions thereof which engage the gasket seat 34, intermediate the cage portions 37 and 38, forms a seat for one end of the thrust spring 35. This thrust spring may, of course, be of any suitable or preferred character. As shown, the spring 35 conveniently may comprise a helical spring element adapted to encircle the shaft and to bear at one end upon the seat formed by the cage 36 on the gasket seat 34. At its other end, the spring may bear upon a shaft abutment which, as shown, may comprise a shoulder 39 formed on the shaft; or the abutment may comprise a shoulder 39 formed on the shaft; or the abutment may comprise a pin or pins, or other means, mounted on the shaft and extending therefrom in position to engage the end of the spring. The spring thus serves to compress and seal the gasket rim 30 against the marginal edge of the ring 18, and serves also to yieldingly press the ring 18 upon the seal seat 16.

The cylindrical portions 21 and 24 of the gasket comprise a sleeve which encircles and frictionally and sealingly engages the surface of the shaft on which mounted. This sleeve is preferably of substantially greater sectional thickness than the thickness of the flexible gasket portion 23. The sleeve extends from its junction with the flexible connecting portion 23 along the shaft for a substantial distance, and includes the tongue or ear portions 25 which extend within the shaft-receiving opening of the seal ring 18, whereby said ring encircles said ears 25 and drivingly interlocks with said ears by virtue of the interfitting spline portions 26 on the ring, so that the ring is mounted against turning movement with respect to the shaft engaging sleeve portion of the gasket, which, in turn, through its frictional connection on the shaft is held against turning movement with respect to the shaft. The ring 18 thus is resiliently driven with the shaft through its splined interconnection with the resilient shaft engaging portions of the gasket, the splined interfitment of the ears 25 on the gasket element and the spline lugs 26 on the ring 18 accomplishing such resilient driving function while allowing limited axial movement of the ring 18 on the shaft and with respect to the resilient shaft engaging portions of the gasket. It will be noted that the resilient ring driving connection is entirely independent of the flexible gasket portions 23, the flexibility of which is entirely unimpaired by the ring driving function of the gasket element.

The sleeve portions 21 and 24 of the gasket also form a fluid-tight seal around the shaft. In order to assure tight sealing and driving engagement of said sleeve with the shaft, the clamping ring 27 is locked upon the sleeve portion 21 by the interfitting ring and gasket portions 28 and 29, whereby the clamp ring may serve to compress the portion 21 tightly upon the shaft on which it is mounted; and the clamp ring is secured against accidental displacement from assembled position by the interengagement of the locking means 28 and 29. The outer gasket wall 22 is also securely and effectively sealed to the rim of the seal ring 18 by means of the gasket surface 33, which is spring pressed against the marginal portions of the rear face of the ring, as well as by the surfaces 32 of the gasket skirt 31 which are compressed upon the rim surface of the ring 18 by the skirt portion 37 of the enclosing cage, thereby effectively sealing the gasket to the seal ring at the peripheral portions thereof. The seal ring 18, in turn, under the influence of the spring 35, forms a tight running seal with the seal seat 16. As a consequence, the shaft is sealed against fluid leakage along the shaft past the seal and through the opening 13 in either direction.

Where the ring 18 comprises metal, the spline lugs 26 may be formed by a broaching operation during the fabrication of the ring as a machine finished element. Where the ring comprises carbon, graphite, ceramic or moldable material, the spline lugs 26 may be molded in the ring during the formation thereof in a suitable pressing die or mold. The gasket 20 of rubber-like material may also be produced inexpensively as a molded product in a suitable molding die. Such die may be configurated to form the gasket, including the inner and outer walls 21 and 22, the flexible connecting portion 23, as well as the extension 24, the spline ears 25, the locking bead 28, the rim 30, skirt 31, sealing surfaces 32 and 33, and the spring thrust shoulder 34, all as an integral piece in finished form as delivered from the forming mold.

It will be seen that the foregoing construction provides a gasket of maximum flexibility in the portions 23, thereby allowing the outer gasket wall portion 22 to move freely in an axial direction with respect to the inner wall portions 21, so that the seal ring 18, effectively sealed to the outer gasket wall portions 22, may move freely in an axial direction on the shaft and with respect to the shaft sealed gasket wall portions 21. The spring 35, consequently, may be of exceedingly light character, to exert a thrust upon the seal ring of magnitude only sufficient to maintain adequate sealing engagement of the ring 18 with the seat 16, the spring 35 being not required to overcome any ring driving stiffness in the gasket. Axial thrust imparted by the spring in the ring 18, and consequent ring friction on the seat 16, is thus a negligible factor allowing the seal to be employed for high speed device. In this connection, seal operating speed is limited by the amount of friction between the seal ring and its cooperating seat, the greater the friction the lower the maximum allowable seal speed without damaging the seal surfaces of the ring or seat. By providing minimum spring thrust requirements in the present seal, friction of the ring on its seat is held at a minimum, thereby providing a seal that is operable at maximum high speed.

It will be seen, also, that the ring 18 is supported entirely in the resilient material of the gasket means 20 and is thereby cushioned against operating shocks and jars. As a consequence, many relatively fragile or brittle materials may be employed for their superior qualities in the ring 18.

The seal of the present invention also allows the components thereof to be assembled as a unit, for sale in condition ready for mounting on a shaft to be sealed by simply applying and sliding the entire assembly axially into mounted position on the shaft. To this end, the clamp ring 27 may be mounted in interlocked position on the gasket portion 21; the ring 18 may then be inserted in the open end of the trough-like gasket and frictionally secured in place by application of the outer cage member 36. Finally, the spring 35 may be pressed upon and frictionally secured on the tapered portion 38 of the cage member, with the end of the spring secured in the seat 34', which may be formed to interlockingly receive the same by forming an outstanding latching rib on the cage portion 38 in position to engage the terminal loop of the spring and hold it in the seat 34'.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. For use in a shaft seal, in combination with a seal ring having a shaft receiving opening therein and an annular seal surface around said opening for engaging and forming a running seal with a seal seat, a gasket of resilient material comprising sleeve-like inner and outer wall portions, disposed concentrically one within the other, a flexible connector portion integrally interconnecting said wall portions, at one end of the gasket, whereby to allow free relative axial displacement of said wall portions, through flexion of said connector portion, the inner wall portion being sized to snugly receive and to sealingly and drivingly grip the shaft to be sealed, said outer wall portion, at its junction with said connector portion, having like sectional thickness and having progressively increasing thickness toward its opposite end, and being formed at its said opposite end to sealingly engage the seal ring, and a supporting shell snugly embracing said outer wall portion at and from its said opposite end toward its junction with said connector portion.

2. For use in a shaft seal, in combination with a seal ring having a shaft receiving opening therein and an annular seal surface around said opening for engaging and forming a running seal with a seal seat, a gasket of resilient material comprising sleeve-like inner and outer wall portions, disposed concentrically one within the other, a flexible connector portion integrally interconnecting said wall portions, at one end of the gasket, whereby to allow free relative axial displacement of said wall portions, through flexion of said connector portion, the inner wall portion being sized to snugly receive and to sealingly and drivingly grip the shaft to be sealed, and being formed, remote from said connector portion, with integral axially extending shoulders for splined engagement with a seal ring, said outer wall portion, at its junction with said connector portion, having like sectional thickness and having progressively increasing thickness toward its opposite end, and being formed at its said opposite end to sealingly engage the seal ring, and a supporting shell snugly embracing said outer wall portion at and from its said opposite end toward its junction with said connector portion.

3. For use in a shaft seal, in combination with a seal ring having a shaft receiving opening therein and an annular seal surface around said opening for engaging and forming a running seal with a seal seat, a gasket of resilient material comprising sleeve-like inner and outer wall portions, disposed concentrically one within the other, a flexible connector portion integrally interconnecting said wall portions, at one end of the gasket, whereby to allow free relative axial displacement of said wall portions, through flexion of said connector portion, the inner wall portion being sized to snugly receive and to sealingly and drivingly grip the shaft to be sealed, said outer wall portion, at its junction with said connector portion, having like sectional thickness and having progressively increasing thickness toward its opposite end and being formed at its said opposite end to sealingly engage the seal ring, a supporting shell snugly embracing said outer wall portion at and from its said opposite end toward its junction with said connector portion, and a clamping band snugly embracing said inner wall portion for compressing the same upon the shaft.

4. For use in a shaft seal, in combination with a seal ring having a shaft receiving opening therein and an annular seal surface around said opening for engaging and forming a running seal with a seal seat, a gasket of resilient material comprising sleeve-like inner and outer wall portions, disposed concentrically one within the other, a flexible connector portion integrally interconnecting said wall portions, at one end of the gasket, whereby to allow free relative axial displacement of said wall portions, through flexion of said connector portion, the inner wall portion being sized to snugly receive and to sealingly and drivingly grip the shaft to be sealed, said outer wall portion, at its end remote from said connector portion being formed to sealingly engage the seal ring, and a clamping band snugly embracing said inner wall portion for compressing the same upon the shaft, said inner wall portion having a pocket therein and an inwardly extending projection on said band in position for interlocking engagement in said pocket to secure the band against axial displacement on the inner wall portion.

5. For use in a shaft seal, in combination with a seal ring having a shaft receiving opening therein and an annular seal surface around said opening for engaging and forming a running seal with a seal seat, a gasket of resilient material comprising sleeve-like inner and outer wall portions disposed concentrically one within the other, a flexible connector portion integrally interconnecting said wall portions, at one end of the gasket, whereby to allow free relative axial displacement of said wall portions, through flexion of said connector portion, the inner wall portion being sized to snugly receive and to sealingly and drivingly grip the shaft to be sealed, said outer wall portion, at its end remote from said connector portion being formed to sealingly engage the seal ring, a clamping band snugly embracing said inner wall portion for compressing the same upon the shaft, said inner wall portion having a pocket therein and an inwardly extending projection on said band in position for interlocking engagement in said pocket to secure the band against axial displacement on the inner wall portion, and a supporting shell snugly embracing said outer wall portion at and adjacent the seal ring.

6. For use in a shaft seal, in combination with a seal ring having a shaft receiving opening therein and an annular seal surface around said opening for engaging and forming a running seal with a cooperating seal seat, a gasket of resilient material having an inner shaft encircling sleeve portion sized to sealingly and drivingly engage the shaft, an outer sleeve portion disposed concentrically outwardly of said shaft encircling sleeve portion and formed at one end with a rim in position to sealingly engage the marginal portions of said ring, a flexible interconnecting portion joining said inner and outer sleeve portions, at the ends thereof remote from said rim, whereby said rim and said ring sealed thereto may move freely in a direction axially of the shaft with respect to said shaft engaging sleeve portion, said outer sleeve portion having diminishing sectional thickness from said rim toward said interconnecting portion and merging therewith in continuous fashion for maximum flexibility, and a support sleeve snugly encircling said rim and said outer sleeve portion to protect and support the latter against buckling and to hold the rim upon the seal ring.

WALTER W. MEYER.

References Cited in the file of this patent

UNITED STATES PATENTS

| Number | Name | Date |
|---|---|---|
| 2,347,118 | Matter | Apr. 18, 1944 |
| 2,365,351 | Matter | Dec. 19, 1944 |
| 2,445,207 | Caserta | July 13, 1948 |
| 2,463,695 | Jensen | Mar. 8, 1949 |
| 2,467,543 | Voytech | Apr. 19, 1949 |
| 2,525,365 | Meyer | Oct. 10, 1950 |